US012722534B2

(12) United States Patent
Mankame et al.

(10) Patent No.: US 12,722,534 B2
(45) Date of Patent: Sep. 1, 2026

(54) VISION-BASED POSITIONING SYSTEM FOR A VEHICLE HEAD RESTRAINT

(71) Applicant: GM Global Technology Operations LLC, Detroit, MI (US)

(72) Inventors: Nilesh D. Mankame, Ann Arbor, MI (US); Dorel M. Sala, Troy, MI (US); Chin-Hsu Lin, Troy, MI (US); Paul W. Alexander, Ypsilanti, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 262 days.

(21) Appl. No.: 18/426,725

(22) Filed: Jan. 30, 2024

(65) Prior Publication Data

US 2025/0242726 A1 Jul. 31, 2025

(51) Int. Cl.
*B60N 2/02* (2006.01)
*B60N 2/00* (2006.01)
(Continued)

(52) U.S. Cl.
CPC ......... *B60N 2/0268* (2023.08); *B60N 2/0028* (2023.08); *B60N 2/0276* (2013.01); *B60N 2/809* (2018.02); *B60N 2/865* (2018.02); *G06T 7/70* (2017.01); *B60N 2/838* (2018.02); *B60N 2/868* (2018.02); *G06T 2207/30196* (2013.01); *G06T 2207/30268* (2013.01)

(58) Field of Classification Search
CPC . G06T 2207/30196; G06T 2207/30268; G06T 7/70; B60R 1/22; B60R 1/29; B60R 21/01542; B60R 21/01552; B60R 21/231; B60R 22/26; B60R 2021/0048; B60R 2021/01315; B60R 2300/8006
See application file for complete search history.

(56) References Cited

U.S. PATENT DOCUMENTS 6,088,640 A * 7/2000 Breed .................... B60N 2/853 297/216.12
6,296,306 B1 * 10/2001 Specht .................. B60N 2/809 297/216.13

(Continued)

FOREIGN PATENT DOCUMENTS

DE 102006020532 A1 11/2006
DE 102009009741 B3 3/2010
DE 102009038374 A1 11/2010

*Primary Examiner* — Fadey S. Jabr
*Assistant Examiner* — Mark Robert Heim
(74) *Attorney, Agent, or Firm* — Vivacqua Crane, PLLC

(57) ABSTRACT

A vision-based positioning system for a head restraint in a vehicle includes one or more head restraint actuators, one or more interior-facing cameras, and more controllers that include one or more processors that execute instructions to determine the head position of the occupant based on the image data received from the one or more interior-facing cameras. The one or more controllers determine a position of the head restraint relative to the head position of the occupant. In response to determining the position of the head restraint falls outside of a bounding box defined relative to a position of the head of the occupant, the one or more controllers instruct the one or more head restraint actuators to adjust the position of the head restraint to fall within the bounding box.

20 Claims, 3 Drawing Sheets

(51) Int. Cl.

*B60N 2/809* (2018.01)
*B60N 2/865* (2018.01)
*G06T 7/70* (2017.01)
*B60N 2/838* (2018.01)
*B60N 2/868* (2018.01)

(56) References Cited

U.S. PATENT DOCUMENTS 6,331,014 B1 * 12/2001 Breed .................... B60N 2/888 297/216.12
6,746,078 B2 * 6/2004 Breed ............... B60R 21/01536 297/216.12
7,438,357 B2 * 10/2008 Becker ................... B60N 2/888 297/216.12
7,448,678 B2 * 11/2008 Browne ................. B60N 2/806 297/216.12
7,588,115 B2 * 9/2009 Breed ................... B60R 21/207 342/72
7,618,091 B2 * 11/2009 Akaike .................. B60N 2/888 297/216.12
7,794,012 B2 * 9/2010 Szablewski ............ B60N 2/003 297/216.12
7,963,598 B2 * 6/2011 Akaike ................ B60N 2/0028 297/216.12
8,600,626 B2 * 12/2013 Yamaguchi ............ B60N 2/829 297/216.12
10,315,661 B2 * 6/2019 Delgado ............ B60H 1/00764
11,541,794 B1 * 1/2023 Muralidharan ....... B60R 21/013
12,240,473 B2 * 3/2025 Moton, Jr. ......... B60H 1/00757
12,351,079 B2 * 7/2025 Andrews .................. B60N 2/22
2007/0257528 A1 * 11/2007 Akaike .................. B60N 2/888 297/216.12
2010/0213748 A1 * 8/2010 Pedrero Iniguez .... B60N 2/829 297/410
2011/0233974 A1 * 9/2011 Yamaguchi .......... B60N 2/0276 297/216.12
2011/0316318 A1 12/2011 Yamaguchi et al.
2012/0032487 A1 * 2/2012 Yamaguchi .......... B60N 2/0277 297/391
2017/0066353 A1 * 3/2017 Ranjan ................... B60N 2/865
2018/0057012 A1 3/2018 Delgado et al.
2019/0359204 A1 * 11/2019 Saito ..................... B60W 30/08
2019/0380621 A1 * 12/2019 Ando ....................... G01B 7/00
2020/0139853 A1 * 5/2020 Nawrocki ................ B60N 2/16
2021/0170928 A1 * 6/2021 Hong ..................... B60N 2/838
2022/0371605 A1 11/2022 Moton, Jr. et al.
2024/0083308 A1 * 3/2024 Kume ...................... B60N 2/22
2024/0308402 A1 * 9/2024 Amodeo .............. B60N 2/0028
2025/0187558 A1 * 6/2025 Rehfeld ............ B60R 21/01554
2025/0242727 A1 * 7/2025 Mankame .............. B60N 2/806

* cited by examiner

VISION-BASED POSITIONING SYSTEM FOR A VEHICLE HEAD RESTRAINT

INTRODUCTION

The present disclosure relates to a vision-based positioning system for a head restraint in a vehicle that continually monitors the head position of an occupant with one or more interior-facing cameras. The vision-based positioning system continually adjusts the position of the head restraint based on the head position such that the head restraint is positioned within a bounding box defined relative to a position of the head of the occupant.

A head restraint for a seat in a vehicle is provided to limit rearward movement of an occupant's head relative to his or her torso during a sudden acceleration or deceleration event. It is to be appreciated that the occupant may adjust the position of a head restraint in a variety of directions such as, for example, the fore-aft direction and the vertical direction. When the head restraint is positioned at its correct fore-aft position the backset distance, which is measured between the back of the occupant's head and the front surface of the head restraint, is as small as possible to minimize neck travel and rotation of the occupant's head during a sudden acceleration or deceleration event.

Placing the head restraint in its correct position, and especially its correct fore-aft position, may create discomfort in some occupants. Specifically, positioning the head restraint in its correct fore-aft position tends to position the head of some occupants in a forward and downward direction, which may result in neck fatigue over an extended period of time. For example, female occupants who are relatively small in stature, occupants who have neck injuries, or individuals who wear certain hairstyles that interfere with the head restraint, such as ponytails, may have their head pushed in the forward and downward direction when their head restraint is in its correct position. Accordingly, these occupants may deviate from the correct position of their head restraint by adjusting the head restraint in an effort to improve their comfort.

Thus, while current head restraints for vehicle seats achieve their intended purpose, there is a need in the art for an improved approach for adjusting the position of the head restraint to enhance occupant comfort while also ensuring the head restraint is in its correct position.

SUMMARY

According to several aspects, a vision-based positioning system for a head restraint in a vehicle is disclosed. The vision-based positioning system includes one or more head restraint actuators, where the head restraint is moveable relative to a seat by the one or more head restraint actuators. The vision-based positioning system also includes one or more interior-facing cameras that capture image data representative of a head position of an occupant relative to the head restraint, wherein the occupant is located within the seat. The vision-based positioning system also includes one or more controllers in electronic communication with the one or more head restraint actuators and the one or more interior-facing cameras. The one or more controllers include one or more processors that execute instructions to continually monitor the one or more interior-facing cameras for the image data representative of the head position of the occupant. The one or more controllers estimate the head position of the occupant based on the image data received from the one or more interior-facing cameras. The one or more controllers determine a position of the head restraint relative to the head position of the occupant. In response to determining the position of the head restraint falls outside of a bounding box defined relative to a position of the head of the occupant, the one or more controllers instruct the one or more head restraint actuators to adjust the position of the head restraint to fall within the bounding box.

In another aspect, the one or more head restraint actuators include a fore-aft actuator for adjusting a fore-aft position of the head restraint.

In yet another aspect, the one or processors of the one or more controllers execute instructions to compare the fore-aft position of the head restraint with a fore-aft range of the bounding box, and in response to determining the fore-aft position of the head restraint falls outside of the fore-aft range of the bounding box, the one or more controllers instruct the fore-aft actuator to adjust the fore-aft position of the head restraint to fall within the fore-aft range of the bounding box.

In an aspect, the fore-aft range of the bounding box extends between a lower bounding value and an upper bounding value of the fore-aft position of the head restraint.

In another aspect, the lower bounding value and the upper bounding value of the fore-aft position of the head restraint are defined relative to a prominent feature of the head of the occupant.

In yet another aspect, the prominent feature is the back of the head of the occupant.

In an aspect, the one or processors of the one or more controllers execute instructions to instruct the fore-aft actuator to adjust the fore-aft position of the head restraint equal to a central fore-aft position, where the central fore-aft position represents a midpoint measured between the lower bounding value and the upper bounding value of the fore-aft position of the head restraint.

In another aspect, the one or more head restraint actuators include a vertical actuator for adjusting a vertical position of the head restraint.

In yet another aspect, the one or processors of the one or more controllers execute instructions to compare the vertical position of the head restraint with a vertical range of the bounding box. In response to determining the vertical position of the head restraint falls outside of the vertical range of the bounding box, the one or more controllers instruct the vertical actuator to adjust the vertical position of the head restraint to fall within the vertical range of the bounding box.

In an aspect, the vertical range of the bounding box extends between a lower bounding value and an upper bounding value of the vertical position of the head restraint.

In another aspect, the lower bounding value and the upper bounding value of the vertical position of the head restraint are defined relative to a vertically oriented prominent feature of the head of the occupant.

In yet another another aspect, the vertically oriented prominent feature of the head of the occupant is one of the following: the top of the head of the occupant, the ears of the occupant, the eyes of the occupant, and the chin of the occupant.

In an aspect, the one or processors of the one or more controllers execute instructions to instruct the vertical actuator to adjust the vertical position of the head restraint equal to a central vertical position, wherein the central vertical position represents a midpoint measured between the lower bounding value and the upper bounding value of the vertical position of the head restraint.

In another aspect, the one or processors of the one or more controllers execute instructions to assess a risk associated with the vehicle deviating from a normal, controlled vehicle trajectory. In response to determining the risk associated with deviating from the normal, controlled vehicle trajectory exceeds a predetermined threshold value, the one or more controllers instruct the one or more head restraint actuators to cease continually adjusting the position of the head restraint.

In yet another aspect, the one or processors of the one or more controllers execute instructions to dynamically update a size of the bounding box based on a plurality of head restraint positioning factors.

In an aspect, the plurality of head restraint positioning factors include one or more of the following: a size of the vehicle, a type of vehicle, vehicle speed, road conditions, weather conditions, traffic conditions, a height and weight of the occupant, a direction of a potential collision, a sensitivity of the vehicle during a collision, a likelihood of collision of the vehicle, a collision prediction factor, and predicted head motion of the occupant.

In another aspect, the one or processors of the one or more controllers execute instructions to determine a risk associated with the vehicle deviating from a normal, controlled vehicle trajectory, where the plurality of head restraint positioning factors are indicative of the risk associated with the vehicle deviating from the normal, controlled vehicle trajectory. In response to determining the risk associated with the vehicle deviating from the normal, controlled vehicle trajectory is increasing, decrease the size of the bounding box. In response to determining the risk associated with the vehicle deviating from the normal, controlled vehicle trajectory is decreasing, the one or more controllers increase the size of the bounding box.

In yet another aspect, the one or more head restraint actuators includes one or more of the following: a y-axis actuator that rotates the head restraint about the y-axis of the vehicle, a z-axis actuator that rotates the head restraint about the z-axis of the vehicle, and a y-axis actuator that adjusts a side-to-side position of the head restraint along the x-axis of the vehicle.

In an aspect, a method for adjusting a position of a head restraint in a vehicle by a vision-based positioning system is disclosed. The method includes continually monitoring, by one or more processors of one or more controllers, one or more interior-facing cameras for image data representative of a head position of an occupant of the vehicle. The method includes determining the head position of the occupant based on the image data received from the one or more interior-facing cameras. The method includes determining a position of the head restraint relative to the head position of the occupant. In response to determining the position of the head restraint falls outside of a bounding box defined relative to a position of the head of the occupant, the method includes instructing one or more head restraint actuators to adjust the position of the head restraint to fall within the bounding box, where the head restraint is moveable relative to a seat by the one or more head restraint actuators and the occupant is located in the seat.

In another aspect, a vision-based positioning system for a head restraint in a vehicle is disclosed. The vision-based positioning system includes one or more head restraint actuators, where the head restraint is moveable relative to a seat by the one or more head restraint actuators. The vision-based positioning system also includes one or more interior-facing cameras that capture image data representative of a head position of an occupant relative to the head restraint, where the occupant is located within the seat and one or more controllers in electronic communication with the one or more head restraint actuators and the one or more interior-facing cameras. The one or more controllers include one or more processors that execute instructions to continually monitor the one or more interior-facing cameras for the image data representative of the head position of the occupant. The one or more controllers determine the head position of the occupant based on the image data received from the one or more interior-facing cameras. The one or more controllers determine a position of the head restraint relative to the head position of the occupant. In response to determining the position of the head restraint falls outside of a bounding box defined relative to a position of the head of the occupant, the one or more controllers instruct the one or more head restraint actuators to adjust the position of the head restraint to fall within the bounding box, where a size of the bounding box is dynamically updated based on a plurality of head restraint positioning factors. The one or more controllers determine a risk associated with the vehicle deviating from a normal, controlled vehicle trajectory, where the plurality of head restraint positioning factors are indicative of the risk associated with the vehicle deviating from the normal, controlled vehicle trajectory. In response to determining the risk associated with the vehicle deviating from the normal, controlled vehicle trajectory is increasing, the one or more controllers decrease a size of the bounding box. In response to determining the risk associated with the vehicle deviating from the normal, controlled vehicle trajectory is decreasing, the one or more controllers increase the size of the bounding box.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
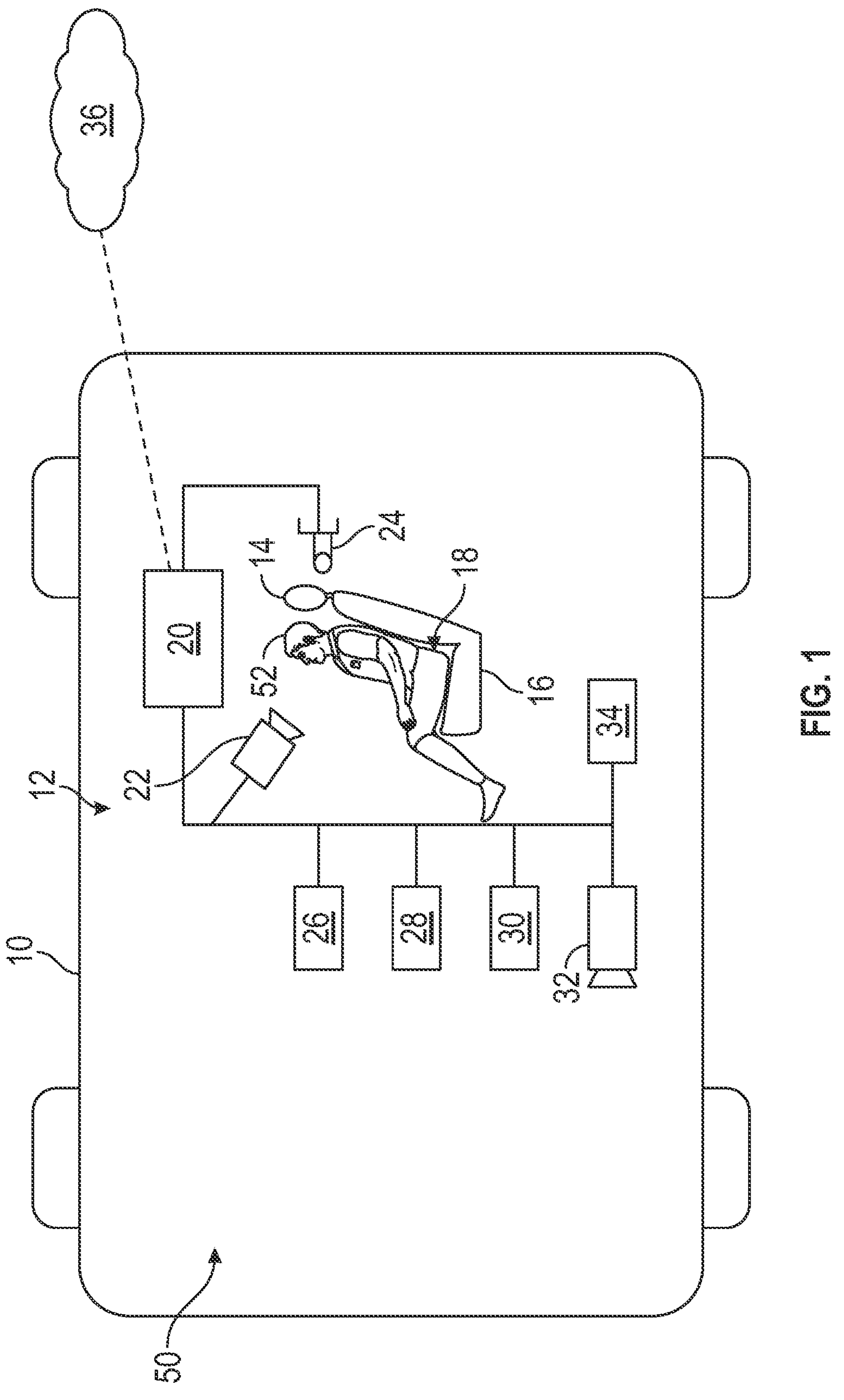
FIG. 1 illustrates a schematic diagram of a vehicle including the disclosed vision-based positioning system for a head restraint, where the vision-based positioning system includes one or more controllers in electronic communication with one or more interior-facing cameras, according to an exemplary embodiment.

Referring to FIG. 1, a vehicle 10 including the disclosed vision-based positioning system 12 for a head restraint 14 that is part of a seat 16 is illustrated. As explained below, the vision-based positioning system 12 continually monitors a head position of an occupant 18 of the vehicle 10 relative to the head restraint 14 by one or more interior-facing cameras 22 and continually adjusts a position of the head restraint 14 based on the occupant's head position. The vision-based positioning system 12 continually adjusts the position of the head restraint 14 such that the head restraint 14 is positioned within a bounding box B (shown in FIG. 3) defined relative to a position of the head 52 of the occupant 18. The size of the bounding box B is dynamically updated based on a plurality of head restraint positioning factors.

It is to be appreciated that the vehicle 10 may be any type of vehicle such as, but not limited to, a sedan, a truck, sport utility vehicle, van, or motor home. In an embodiment, the vehicle 10 is an aircraft, marine vehicle, earth-moving machine, or train. The vision-based positioning system 12 includes one or more controllers 20 in electronic communication with the one or more interior-facing cameras 22, one or more head restraint actuators 24, one or more vehicle dynamics controllers 26, one or more active safety systems 28, one or more occupant restraint systems 30, one or more external-facing cameras 32, and one or more vehicle sensors 34.

In one non-limiting embodiment, the one or more controllers 20 are also in wireless communication with one or more vehicle networks 36. The vehicle networks 36 indicate data pertaining to external factors such as, but not limited to, traffic conditions, road conditions, weather conditions, visibility conditions, and telemetry data regarding surrounding vehicles. Some examples of weather conditions include, but are not limited to, rain, snow, or sleet. The road conditions indicate a coefficient of friction of the roadway the vehicle 10 is presently traveling along and indicate the presence of snow or ice located along the roadway. The visibility conditions are based on weather conditions such as the presence of fog, snow, and ice. The visibility conditions are also based on a time of day and indicate lighting conditions such, for example, daylight lighting conditions, dusk lighting conditions, or nighttime lighting conditions. Some examples of the vehicle networks 36 include, but are not limited to, vehicle-to-vehicle (V2V) communication networks and vehicle-to-infrastructure (V2I) communication networks.

The one or more interior-facing cameras 22 are positioned within an interior cabin 50 of the vehicle 10 and capture image data indicative of the head position of the occupant 18 relative to the head restraint 14. It is to be appreciated that the occupant 18 is located within the seat 16. In one embodiment, the one or more interior-facing cameras 22 are part of an existing in-vehicle system that captures image data representative of the head position of the occupant 18 such as, for example, an occupant monitoring system (OMS). In another embodiment, the one or more interior-facing cameras 22 are part of an external device that is in electronic communication with the one or more controllers 20 such as, for example, a smartphone or tablet computer. The one or more controllers 20 receive the image data indicative of the head position of the occupant 18 from the one or more interior-facing cameras 22 and determine the head position of the occupant 18 based on the image data.

Continuing to refer to FIG. 1, the one or more controllers 20 receive one or more vehicle dynamics variables from the one or more vehicle dynamics controllers 26. The one or more vehicle dynamics variables are indicative of the motion of the vehicle 10 and include variables such as, but not limited to, longitudinal velocity change, rolling angle, pitch velocity, pitch angle, and brake engagement.

The one or more active safety systems 28 include any vehicle system that prevents a collision from occurring or mitigates the effects of a collision and includes systems such as, for example, anti-lock braking (ABS) systems, electronic stability control (ESC) systems, and lane departure warning systems. The one or more active safety systems 28 send an activation signal to the one or more controllers 20 when activated. The activation signal indicates the vehicle 10 is potentially undergoing a collision, is at a risk of collision, or is deviating from a normal vehicle trajectory.

The one or more occupant restraint systems 30 are associated with either a seatbelt or an airbag corresponding to the occupant 18 located within the seat 16. In one embodiment, the occupant restraint systems 30 refer to an anchor pretensioner of a seatbelt, a load limiter of the seatbelt, and an airbag associated with an occupant 18. The one or more occupant restraint systems 30 transmit a notification when activated. Some examples of an occupant restraint system 30 being activated include when the anchor pretensioner is triggered, when the load limiter exceeds a corresponding threshold, or when one or more airbags are deployed. In one embodiment, the notification also indicates a stage of deployment of the airbag (e.g., a first stage deployment or a dual stage deployment).

The one or more external-facing cameras 32 are positioned to capture image data representative of an environment surrounding the vehicle 10. The one or more external-facing cameras 32 may provide information regarding the current traffic conditions, the road conditions, the weather conditions, and the visibility conditions. Some examples of weather conditions include, but are not limited to, rain, snow, or sleet. The one or more additional vehicle sensors 34 include sensors such as, but not limited to, radar and LiDAR.

Figure 2:
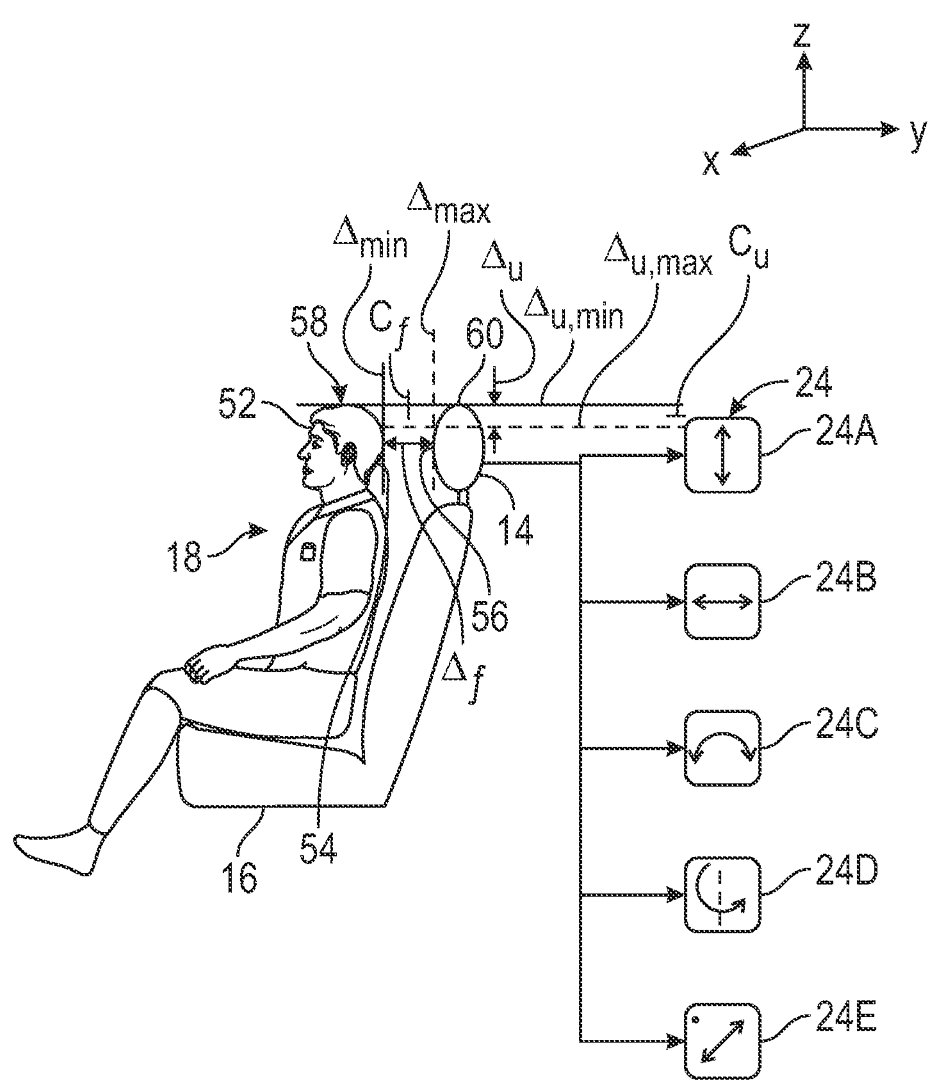
FIG. 2 is a schematic diagram illustrating the head restraint, a corresponding seat of the head restraint, and one or more head restraint actuators for adjusting the position of the head restraint, according to an exemplary embodiment.

FIG. 2 is a schematic diagram illustrating a head 52 of the occupant 18 relative to the head restraint 14, the seat 16, and the one or more head restraint actuators 24. Referring to both FIGS. 1 and 2, the head restraint 14 is moveable relative to the seat 16 by the one or more head restraint actuators 24. Specifically, the one or more controllers 20 instruct the one or more head restraint actuators 24 to adjust the fore-aft position of the head restraint 14, the vertical position of the head restraint 14, or both the fore-aft position and the vertical position of the head restraint 14. The one or more head restraint actuators 24 include a vertical actuator 24A for adjusting the vertical position of the head restraint 14 and a fore-aft actuator 24B for adjusting the fore-aft position of the head restraint 14.

In the non-limiting embodiment as shown in FIG. 2, the one or more head restraint actuators 24 also includes one or more additional head position actuators 24C, 24D, 24E. Specifically, the one or more head restraint actuators 24 include a y-axis actuator 24C for rotating the head restraint 14 about the y-axis of the vehicle 10, a z-axis actuator 24D for rotating the head restraint 14 about the z-axis of the vehicle 10, and a y-axis actuator 24E for adjusting a side-to-side position of the head restraint 14 along the x-axis of the vehicle 10. The x-axis is aligned with the roll axis of the vehicle 10, the y-axis is aligned with the pitch axis of the vehicle 10, and the z-axis is aligned with the yaw axis of the vehicle 10. In the event the one or more controllers 20 determine a collision that creates an oblique impact to the vehicle 10 is imminent, the one or more controllers 20 instruct two or more of the head restraint actuators 24 to adjust the position of the head restraint 14 of the occupant 18 to align with the direction of the oblique impact.

The one or more controllers 20 continually adjusts a position of the head restraint 14 based on the head position of the occupant 18 relative to the head restraint 14. As explained below, the head restraint 14 is positioned within the bounding box B (FIG. 3) defined relative to a position of the head 52 of the occupant 18, where the one or more controllers 20 dynamically update the size of the bounding box B based on a plurality of head restraint positioning factors. As seen in FIG. 2, the fore-aft position $\Delta_f$ of the head restraint 14 is constrained between a lower bounding value $\Delta_{min}$ and an upper bounding value $\Delta_{max}$, or $\Delta_{min} \leq \Delta_f \leq \Delta_{max}$, where the fore-aft position $\Delta_f$ of the head restraint 14 is measured between the back 54 of the head 52 of the occupant 18 and a front surface 56 of the head restraint 14. The lower bounding value $\Delta_{min}$ and the upper bounding value $\Delta_{max}$ of the fore-aft position $\Delta_f$ are defined relative to a prominent feature of the head 52 of the occupant 18. In the non-limiting embodiment as shown in FIG. 2, the prominent feature is the back 54 of the head 52 of the occupant 18, however, other salient features of the head 52 of the occupant 18 may be used instead. It is to be appreciated that the prominent feature of the head 52 of the occupant 18 represents the datum for the fore-aft position $\Delta_f$ of the head 52 of the occupant 18. Accordingly, if another prominent feature of the head 52 is used instead, then the lower bounding value $\Delta_{min}$ and the upper bounding value $\Delta_{max}$ associated with the fore-aft position $\Delta_f$ are adjusted accordingly. The lower bound $\Delta_{min}$ for the fore-aft position $\Delta_f$ of the head restraint 14 is dynamically updated and is determined based on occupant comfort, while the value of the upper bound $\Delta_{max}$ of the fore-aft position of the head restraint 14 is dynamically updated and represents a maximum allowable backset distance of the head restraint 14 under current operating conditions of the vehicle 10.

Continuing to refer FIG. 2, the vertical position $\Delta_u$ of the head restraint 14 is constrained between a lower bounding value $\Delta_{u,min}$ and an upper bounding value $\Delta_{u,max}$, Or $\Delta_{u,min} \leq \Delta_u \leq \Delta_{u,max}$, where the vertical position $\Delta_u$ of the head restraint 14 is measured between the top 58 of the head 52 of the occupant 18 and a top surface 60 of the head restraint 14. The lower bounding value $\Delta_{u,min}$ and the upper bounding value $\Delta_{u,max}$ of the vertical position $\Delta_u$ of the head restraint 14 are defined relative to a vertically oriented prominent feature of the head 52 of the occupant 18. In the non-limiting embodiment as shown in FIG. 2, the vertically oriented prominent feature of the head of the occupant 18 is the top 58 of the head 52 of the occupant 18, where the lower bounding value $\Delta_{u,min}$ of the vertical position of the head restraint 14 aligns the top surface 60 of the head restraint 14 with the top 58 of the head 52 of the occupant 18. Although FIG. 2 illustrates the top 58 of the head 52 of the occupant 18 as the vertically oriented prominent feature, the vertically oriented prominent feature may include other salient features of the head 52 of the occupant 18 as well such as, for example, the ear, eyes, or chin of the occupant 18. It is to be appreciated that the vertically oriented prominent feature of the head 52 of the occupant 18 represents the datum for the vertical position $\Delta_u$ of the head 52 of the occupant 18. Accordingly, if another vertically oriented prominent feature of the head 52 is used instead, then the lower bounding value $\Delta_{u,min}$ and the upper bounding value $\Delta_{u,max}$ associated with the vertical position $\Delta_u$ are adjusted accordingly. The lower bounding value $\Delta_{u,min}$ of the vertical position $\Delta_u$ of the head restraint 14 is dynamically updates and is determined based on occupant comfort, while the value of the upper bound $\Delta_{u,max}$ of the vertical position $\Delta_u$ of the head restraint 14 is dynamically updated.

Figure 3:
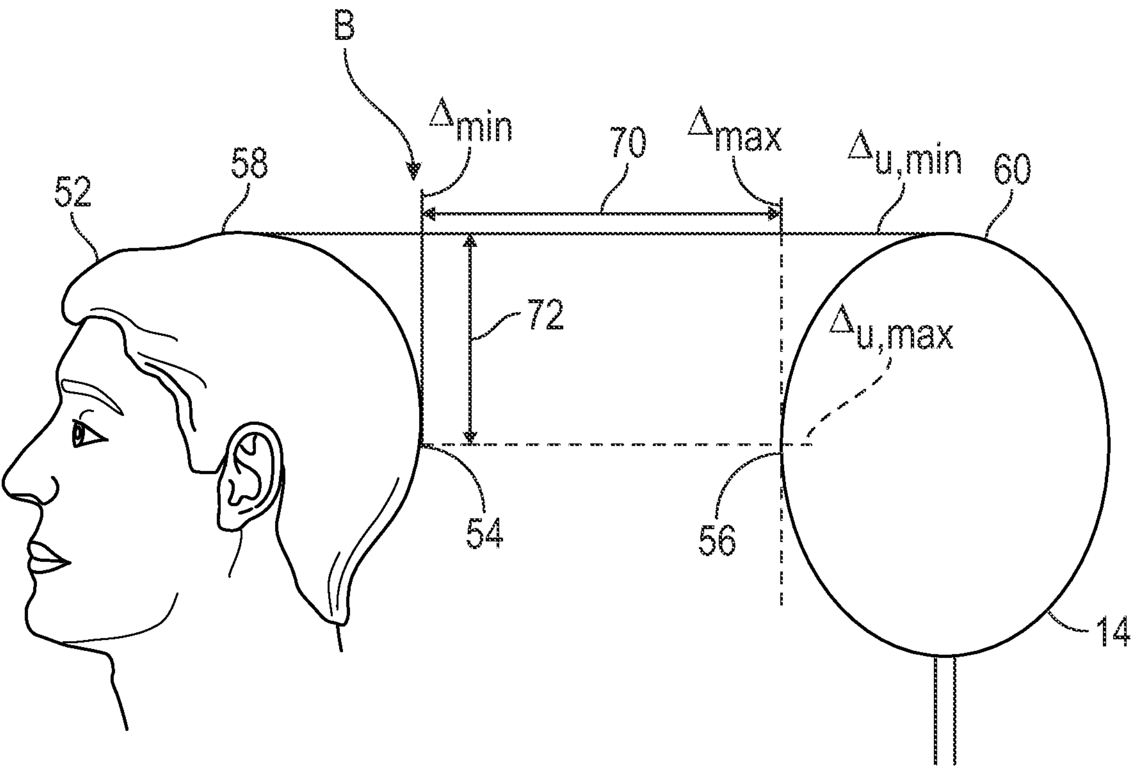
FIG. 3 is a diagram illustrating a bounding box that determines the position of the head restraint, according to an exemplary embodiment.

Referring to FIGS. 1-3, the bounding box B (FIG. 3) is defined by the lower bounding value and the upper bounding value of the position of the head restraint 14. Specifically, the bounding box B is defined by a fore-aft range 70 that extends between the lower bounding value $\Delta_{min}$ and the upper bounding value $\Delta_{max}$ of the fore-aft position $\Delta_f$. The bounding box B is also defined by a vertical range 72 that extends between the lower bounding value $\Delta_{u,min}$ and the upper bounding value $\Delta_{u,max}$ of the vertical position $\Delta_u$. The one or more controllers 20 continually monitors the one or more interior-facing cameras 22 for the image data representative of the head position of the occupant 18 located within the seat 16. The one or more controllers 20 then estimate the head position of the occupant 18 based on the image data received from the one or more interior-facing cameras 22. The one or more controllers 20 then determine a position of the head restraint 14 relative to the head position of the occupant 18.

In response to determining the position of the head restraint 14 falls outside the bounding box B, the one or more controllers 20 instruct the one or more head restraint actuators 24 to adjust the position of the head restraint 14 to fall within the bounding box B. Specifically, if the fore-aft position $\Delta_f$ of the head restraint 14 is adjusted, then the one or more controllers 20 compare the fore-aft position $\Delta_f$ of the head restraint 14 with the fore-aft range 70 of the bounding box B (FIG. 3). In response to determining the fore-aft position $\Delta_f$ of the head restraint 14 falls outside of the fore-aft range 70 of the bounding box B, the one or more controllers 20 instruct the fore-aft actuator 24B (FIG. 2) to adjust the fore-aft position $\Delta_f$ of the head restraint 14 to fall within the fore-aft range 70 of the bounding box B. In one non-limiting embodiment, the one or more controllers 20 instruct the fore-aft actuator 24B (FIG. 2) to adjust the fore-aft position $\Delta_f$ of the head restraint 14 to be equal to a central fore-aft position $C_f$. As seen in FIG. 2, the central fore-aft position $C_f$ represents a midpoint measured between the lower bounding value $\Delta_{min}$ and the upper bounding value $\Delta_{max}$ of the fore-aft position of the head restraint 14.

The vision-based positioning system 12 may also make a similar adjustment for the vertical position of the head restraint 14 as well. Specifically, the one or more controllers 20 compare the vertical position $\Delta_u$ of the head restraint 14 with the vertical range 72 of the bounding box B (FIG. 3). In response to determining the vertical position $\Delta_u$ of the head restraint 14 falls outside of the vertical range 72 of the bounding box B, the one or more controllers 20 instruct the vertical actuator 24A (FIG. 2) to adjust the vertical position $\Delta_u$ of the head restraint 14 to fall within the vertical range 72 of the bounding box B. In one non-limiting embodiment, the one or more controllers 20 instruct the vertical actuator 24A to position the top surface 60 of the head restraint 14 at a central vertical position $C_u$. As seen in FIG. 2, the central vertical position $C_u$ represents a midpoint measured between the lower bounding value $\Delta_{u,min}$ and the upper bounding value $\Delta_{u,max}$ of the vertical position $\Delta_u$ of the head restraint 14.

It is to be appreciated that the one or more controllers 20 continually monitor the one or more vehicle dynamics controllers 26, the one or more active safety systems 28, the one or more occupant restraint systems 30, the one or more external-facing cameras 32, and the one or more vehicle sensors 34 to assess a risk associated with the vehicle 10 deviating from a normal, controlled vehicle trajectory. Some examples of deviating from the normal, controlled vehicle trajectory include slipping on an icy road or colliding with another vehicle or object. When the risk associated with deviating from the normal, controlled vehicle trajectory exceeds a predetermined threshold value, the one or more controllers 20 instruct the one or more head restraint actuators 24 cease continually adjusting the position of the head restraint 14 as described above. Instead, the one or more controllers 20 position of the head restraint 14 to minimize neck travel and rotation of the head 52 of the occupant 18 during a sudden acceleration or deceleration event. However, once the one or more controllers 20 determine the risk no longer exceeds the predetermined threshold value, then the one or more controllers 20 may resume continually adjusting the position of the head restraint 14 as described above. The predetermined threshold value may be adjusted based on factors such as, for example, vehicle weight and vehicle type (sedan, truck, etc.). The predetermined threshold value indicates it is more likely than not the vehicle 10 will deviate from the normal, controlled vehicle trajectory.

The vision-based positioning system 12 continually monitors the plurality of head restraint positioning factors and dynamically updates the fore-aft range 70 and the vertical range 72 of the bounding box B based on the plurality of head restraint positioning factors. Specifically, the one or more controllers 20 adjust the lower bounding value $\Delta_{min}$ and the upper bounding value $\Delta_{max}$ of the fore-aft position $\Delta_f$, the lower bounding value $\Delta_{u,min}$ and the upper bounding value $\Delta_{u,max}$ of the vertical position $\Delta_u$, or both based on the plurality of head restraint positioning factors. The plurality of head restraint positioning factors are indicative of the risk associated with the vehicle 10 deviating from the normal, controlled vehicle trajectory. The plurality of head restraint positioning factors include one or more of the following: a size of the vehicle 10, a type of vehicle (e.g., sedan, truck, etc.), vehicle speed, road conditions, weather conditions, traffic conditions, a height and weight of the occupant 18, a direction of a potential collision, the sensitivity of the vehicle 10 during a collision, the likelihood of collision of the vehicle 10, a collision prediction factor, and predicted head motion of the occupant 18. As the risk associated with the vehicle 10 deviating from the normal, controlled vehicle trajectory increases, the size of the bounding box B decreases in size (e.g., the fore-aft range 70 and the vertical range 72 of the bounding box B decrease), thereby moving the head restraint 14 progressively closer to the head 52 of the occupant 18. Similarly, as the risk associated with the vehicle 10 deviating from the normal, controlled vehicle trajectory decreases, the size of the bounding box B increases and the head restraint 14 may be positioned further away from the head 52 of the occupant 18.

The sensitivity of the vehicle 10 during a collision refers to an amount of deformation the vehicle 10 undergoes during a collision. The sensitivity of the vehicle 10 during a collision is based on factors such as, but not limited to, the size of the interior cabin 50 of the vehicle 10 (FIG. 1), vehicle weight, and a stiffness of the vehicle 10. The likelihood of collision is based on a plurality of driving conditions such as, but not limited to, the current traffic conditions, the road conditions, the weather conditions, and the visibility conditions. The one or more controllers 20 may receive data indicative of the driving conditions from the external-facing cameras 32 and the one or more vehicle networks 36. When one or more of the driving conditions are reduced or degraded, the one or more controllers 20 determine the likelihood of collision of the vehicle 10 has increased. Some examples of reduced or degraded driving conditions include, but are not limited to, the current traffic conditions indicate congestion has increased, the road conditions indicate the coefficient of friction has decreased (thereby the roadway has become more slippery), adverse weather conditions such as heavy snow or rain, and reduced visibility conditions.

The collision prediction factor indicates a type of collision that the vehicle 10 undergoes and is determined based on the one or more vehicle dynamics variables from the one or more vehicle dynamics controllers 26. Some examples of the type of collision that the vehicle 10 undergoes include, but are not limited to, a head-on collision, a rear-end collisions, a side-impact collision, a single vehicle collision, and a rollover. The one or more controllers 20 receive one or more vehicle dynamics variables as input and determines the collision prediction factor based on the one or more vehicle dynamics variables.

The predicted head motion of the occupant 18 indicates a magnitude and a direction of travel of the head 52 of the occupant 18 during a collision. The one or more controllers 20 determine the magnitude and the direction of travel of the head 52 of the occupant 18 during a collision based on the activation signal received from the one or more active safety systems 28, the notification of the one or more occupant restraint systems 30, and the image data representative of the environment surrounding the vehicle 10 from the one or more external-facing cameras 32.

Referring generally to the figures, the disclosed vision-based positioning system for a head restraint provides various technical effects and benefits. Specifically, the vision-based positioning system positions the head restraint to minimize neck travel and rotation of the head of the occupant during a sudden acceleration or deceleration event when the risk associated with vehicle deviating from the normal, controlled vehicle trajectory increases, while still allowing the occupant to maximize his or her comfort in situations when the risk is relatively low or minimal. The vision-based positioning system continually monitors the head position of the occupant and adjusts a position of the head restraint based to fall within a bounding box defined relative to the head of the occupant. It is to be appreciated that the size of the bounding box is dynamically updated to position the head restraint progressively closer to the head of the occupant as the risk associated with the vehicle deviating from the normal, controlled vehicle trajectory increases. Similarly, as the risk associated with the vehicle deviating from the normal, controlled vehicle trajectory decreases, the size of the bounding box increases, thereby allowing the occupant to adjust the position of the head restraint to maximize his or her comfort.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vision-based positioning system for a head restraint in a vehicle, the vision-based positioning system comprising:

one or more head restraint actuators, wherein the head restraint is moveable relative to a seat by the one or more head restraint actuators;

one or more interior-facing cameras that capture image data representative of a head position of an occupant relative to the head restraint, wherein the occupant is located within the seat; and one or more controllers in electronic communication with the one or more head restraint actuators and the one or more interior-facing cameras, wherein the one or more controllers include one or more processors that execute instructions to:

continually monitor the one or more interior-facing cameras for the image data representative of the head position of the occupant;

estimate the head position of the occupant based on the image data received from the one or more interior-facing cameras;

determine a position of the head restraint relative to the head position of the occupant;

in response to determining the position of the head restraint falls outside of a bounding box defined relative to a position of the head of the occupant, instruct the one or more head restraint actuators to adjust the position of the head restraint to fall within the bounding box;

assess a risk associated with the vehicle deviating from a normal, controlled vehicle trajectory, wherein deviating from the normal, controlled vehicle trajectory includes vehicle slippage along a roadway; and in response to determining the risk associated with the vehicle deviating from the normal, controlled vehicle trajectory exceeds a predetermined threshold value, instruct the one or more head restraint actuators to cease continually adjusting the position of the head restraint.

2. The vision-based positioning system of claim 1, wherein the one or more head restraint actuators include a fore-aft actuator for adjusting a fore-aft position of the head restraint.

3. The vision-based positioning system of claim 2, wherein the one or processors of the one or more controllers execute instructions to:

compare the fore-aft position of the head restraint with a fore-aft range of the bounding box; and in response to determining the fore-aft position of the head restraint falls outside of the fore-aft range of the bounding box, instruct the fore-aft actuator to adjust the fore-aft position of the head restraint to fall within the fore-aft range of the bounding box.

4. The vision-based positioning system of claim 3, wherein the fore-aft range of the bounding box extends between a lower bounding value and an upper bounding value of the fore-aft position of the head restraint.

5. The vision-based positioning system of claim 4, wherein the lower bounding value and the upper bounding value of the fore-aft position of the head restraint are defined relative to a prominent feature of the head of the occupant.

6. The vision-based positioning system of claim 5, wherein the prominent feature is the back of the head of the occupant.

7. The vision-based positioning system of claim 4, wherein the one or processors of the one or more controllers execute instructions to:

instruct the fore-aft actuator to adjust the fore-aft position of the head restraint equal to a central fore-aft position, wherein the central fore-aft position represents a mid-point measured between the lower bounding value and the upper bounding value of the fore-aft position of the head restraint.

8. The vision-based positioning system of claim 1, wherein the one or more head restraint actuators include a vertical actuator for adjusting a vertical position of the head restraint.

9. The vision-based positioning system of claim 8, wherein the one or processors of the one or more controllers execute instructions to:

compare the vertical position of the head restraint with a vertical range of the bounding box; and in response to determining the vertical position of the head restraint falls outside of the vertical range of the bounding box, instruct the vertical actuator to adjust the vertical position of the head restraint to fall within the vertical range of the bounding box.

10. The vision-based positioning system of claim 9, wherein the vertical range of the bounding box extends between a lower bounding value and an upper bounding value of the vertical position of the head restraint.

11. The vision-based positioning system of claim 10, wherein the lower bounding value and the upper bounding value of the vertical position of the head restraint are defined relative to a vertically oriented prominent feature of the head of the occupant.

12. The vision-based positioning system of claim 11, wherein the vertically oriented prominent feature of the head of the occupant is one of the following: the top of the head of the occupant, the ears of the occupant, the eyes of the occupant, and the chin of the occupant.

13. The vision-based positioning system of claim 10, wherein the one or processors of the one or more controllers execute instructions to:

instruct the vertical actuator to adjust the vertical position of the head restraint equal to a central vertical position, wherein the central vertical position represents a mid-point measured between the lower bounding value and the upper bounding value of the vertical position of the head restraint.

14. The vision-based positioning system of claim 1, wherein the one or processors of the one or more controllers execute instructions to:

dynamically update a size of the bounding box based on a plurality of head restraint positioning factors.

15. The vision-based positioning system of claim 14, wherein the plurality of head restraint positioning factors include one or more of the following: a size of the vehicle, a type of vehicle, vehicle speed, road conditions, weather conditions, traffic conditions, a height and weight of the occupant, a direction of a potential collision, a sensitivity of the vehicle during a collision, a likelihood of collision of the vehicle, a collision prediction factor, and predicted head motion of the occupant.

16. The vision-based positioning system of claim 14, wherein the one or processors of the one or more controllers execute instructions to:

in response to determining the risk associated with the vehicle deviating from the normal, controlled vehicle trajectory is increasing, decrease the size of the bounding box; and in response to determining the risk associated with the vehicle deviating from the normal, controlled vehicle trajectory is decreasing, increase the size of the bounding box.

17. The vision-based positioning system of claim 1, wherein the one or more head restraint actuators includes one or more of the following: a y-axis actuator that rotates the head restraint about the y-axis of the vehicle, a z-axis actuator that rotates the head restraint about the z-axis of the vehicle, and a y-axis actuator that adjusts a side-to-side position of the head restraint along the x-axis of the vehicle.

18. A method for adjusting a position of a head restraint in a vehicle by a vision-based positioning system, the method comprising:

continually monitoring, by one or more processors of one or more controllers, one or more interior-facing cameras for image data representative of a head position of an occupant of the vehicle;

determining the head position of the occupant based on the image data received from the one or more interior-facing cameras;

determining a position of the head restraint relative to the head position of the occupant;

in response to determining the position of the head restraint falls outside of a bounding box defined relative to a position of the head of the occupant, instructing one or more head restraint actuators to adjust the position of the head restraint to fall within the bounding box, wherein the head restraint is moveable relative to a seat by the one or more head restraint actuators and the occupant is located in the seat;

assessing a risk associated with the vehicle deviating from a normal, controlled vehicle trajectory, wherein deviating from the normal, controlled vehicle trajectory includes vehicle slippage along a roadway; and in response to determining the risk associated with the vehicle deviating from the normal, controlled vehicle trajectory exceeds a predetermined threshold value, instructing the one or more head restraint actuators to cease continually adjusting the position of the head restraint.

19. A vision-based positioning system for a head restraint in a vehicle, the vision-based positioning system comprising:

one or more head restraint actuators, wherein the head restraint is moveable relative to a seat by the one or more head restraint actuators;

one or more interior-facing cameras that capture image data representative of a head position of an occupant relative to the head restraint, wherein the occupant is located within the seat; and one or more controllers in electronic communication with the one or more head restraint actuators and the one or more interior-facing cameras, wherein the one or more controllers include one or more processors that execute instructions to:

continually monitor the one or more interior-facing cameras for the image data representative of the head position of the occupant;

determine the head position of the occupant based on the image data received from the one or more interior-facing cameras;

determine a position of the head restraint relative to the head position of the occupant; and in response to determining the position of the head restraint falls outside of a bounding box defined relative to a position of the head of the occupant, instruct the one or more head restraint actuators to adjust the position of the head restraint to fall within the bounding box, wherein a size of the bounding box is dynamically updated based on a plurality of head restraint positioning factors;

determine a risk associated with the vehicle deviating from a normal, controlled vehicle trajectory, wherein the plurality of head restraint positioning factors are indicative of the risk associated with the vehicle deviating from the normal, controlled vehicle trajectory, and wherein deviating from the normal, controlled vehicle trajectory includes vehicle slippage along a roadway;

in response to determining the risk associated with the vehicle deviating from the normal, controlled vehicle trajectory is increasing, decrease a size of the bounding box; and in response to determining the risk associated with the vehicle deviating from the normal, controlled vehicle trajectory is decreasing, increase the size of the bounding box.

20. The vision-based positioning system of claim 1, wherein the vehicle slippage is created by an icy road.

* * * * *